Jan. 7, 1964  J. R. TRICE, JR  3,116,557
METHOD AND MEANS FOR LAYING SEWER PIPE
Filed Dec. 4, 1957  3 Sheets-Sheet 1

INVENTOR
James R. Trice, Jr.

BY Mason, Fenwick & Lawrence
ATTORNEYS

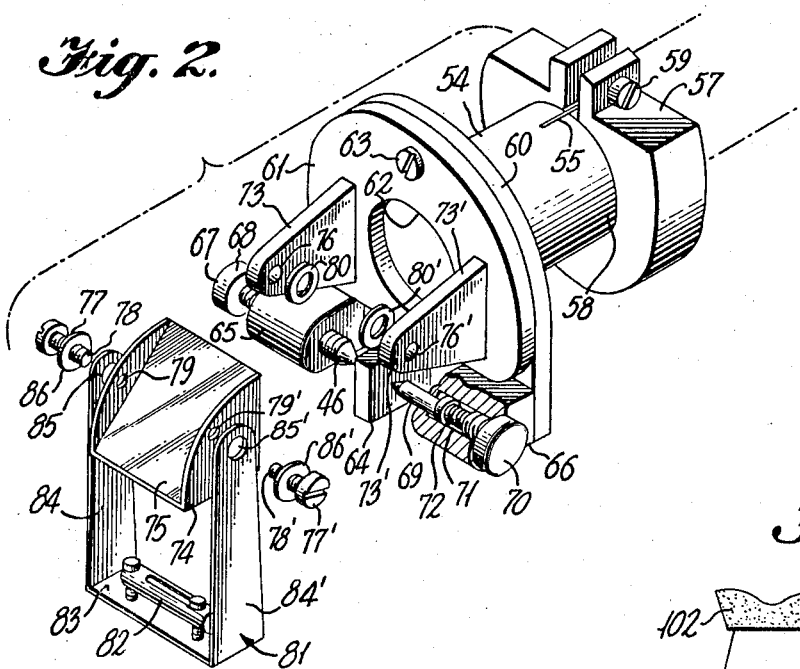

Jan. 7, 1964 J. R. TRICE, JR 3,116,557
METHOD AND MEANS FOR LAYING SEWER PIPE
Filed Dec. 4, 1957 3 Sheets-Sheet 3

INVENTOR
James R. Trice, Jr.

BY Mason, Fenwick & Lawrence
ATTORNEYS

United States Patent Office 3,116,557
Patented Jan. 7, 1964

3,116,557
METHOD AND MEANS FOR LAYING SEWER PIPE
James Rufus Trice, Jr., 8275 Lincoln St., Arlington, Va.
Filed Dec. 4, 1957, Ser. No. 700,604
2 Claims. (Cl. 33—46)

This invention relates to a method and means for laying out a sewer pipeline and more particularly to a method and means for laying said pipeline on a selected grade line by resort to establishing a light beam line of reference.

Sewer pipeline setting involves the making of a great many computations with continual checking and re-checking of the computations in order to obtain a finished pipeline which is located precisely on grade. When the course of the sewer pipeline has been surveyed, manhole locations are marked off every 400 feet or less along the line, and markers are set up. Batterboards are set at distances of approximately 25 feet along the line between manhole markers, and are of such height that a line passing through the batterboard sights will be above the highest knoll in the terrain between the two manholes. When a chalk line is strung across the batterboards, a line of reference is established which may be used for setting the pipeline by the use of a gauge pole which extends from the chalk line to the top of a section of pipe being laid, a plumb bob being used to keep the gauge pole in vertical alignment. If the sewer line is to be laid 13 feet below the level of the lowest place in the terrain and at this point the batterboard stands 7 feet above this level, the gauge pole would be 20 feet long.

The trench is opened by use of equipment selected according to the nature of the terrain, the batterboard line being used as a reference for opening the trench. In addition to the crew of men who rig the pipe into the trench, the pipe setter and his helper and the gauge pole handler comprise a crew for setting the sewer line. To align the pipe, many instructions are called back and forth between the pipesetter and the gauge pole handler. All the fine grading for the setting of the pipe is done by hand, gravel and dirt being pulled by hand under the pipe where the trench has been cut too deep or by lifting the pipe and letting it fall where the bottom of the trench is a little too high in order to set the pipe on grade with reference to the batterboard line. The chances of making errors are very great, due to the fact that many instructions concerned with movement of the pipe a fraction of an inch must be communicated between the pole handler and the pipe setter before agreement is reached that the pipe section is set on grade. Using this well-known method of laying pipe, a crew can lay about 150 to 300 feet of pipeline per day.

Consequently, it is an object of the present invention to provide a method and means for installing a sewer pipeline which eliminates a major portion of the human element in aligning a pipeline as it is laid.

Another object of the present invention is to provide a means for directing a reference medium along the axis of the pipeline.

Still another object of the present invention is to provide means for aligning each section of the pipeline with the axial reference medium as the section is laid, thereby eliminating the gauger in the setting and aligning of the pipe sections.

Other objects of the present invention will become apparent from the following description of one embodiment of the invention when read in conjunction with the accompanying drawings, wherein:

FIGURE 2 is an exploded perspective view of the prism attachment for installation on the transit telescope for aligning the projector with a distant marker;

FIGURE 3 is a vertical sectional view through the target carrier installed in the end of a section of pipe;

FIGURE 4 is a vertical transverse sectional view, taken on the line 4—4 of FIGURE 3;

Figure 1:
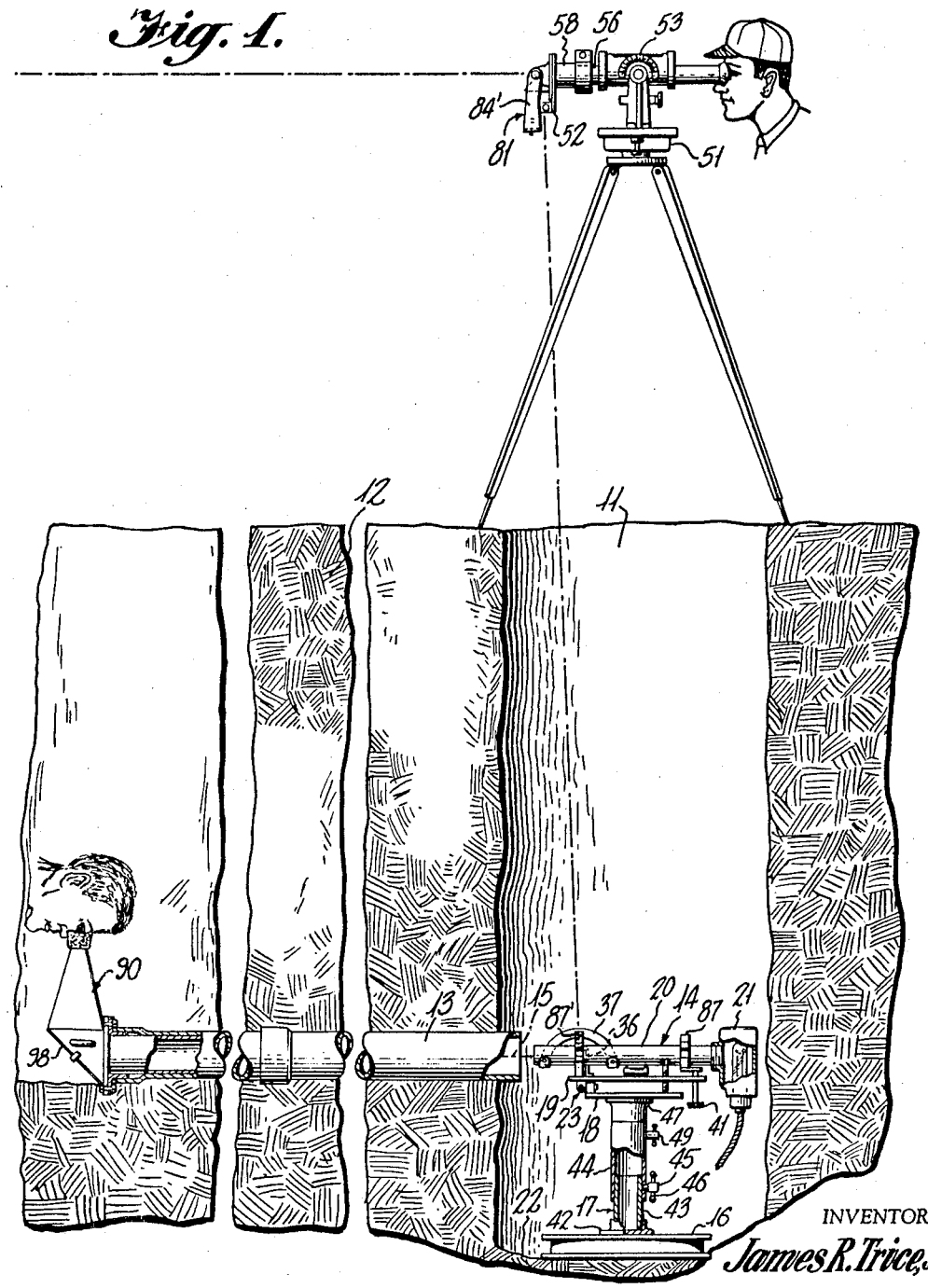
FIGURE 1 is a vertical longitudinal sectional view through a manhole and pipeline trench showing the projector and target of the present invention set up in place with a surveyor's transit mounted at the top of the manhole, central portions of the manhole being broken away to reduce the overall length of the view and with parts of the structure broken away to show the interior thereof.
Figure 5:
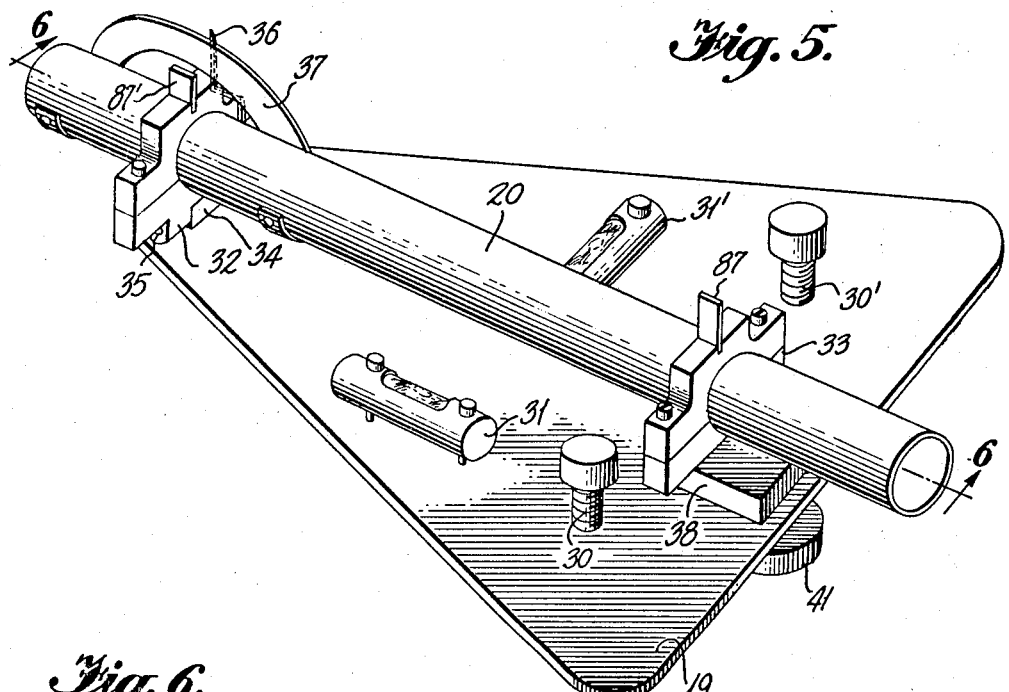
FIGURE 5 is a perspective view of the projector tube mounted on the leveling plate, the light source having been removed from the end of the tube.
Figure 6:
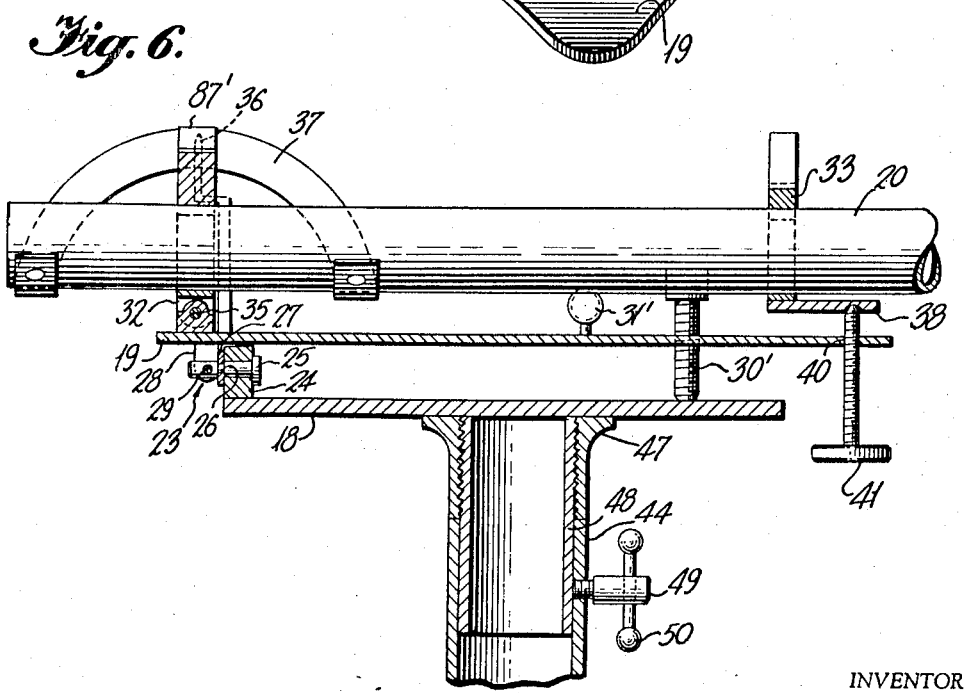
FIGURE 6 is a sectional view taken on the line 6—6 of FIGURE 5.

Adverting now to the drawings, and particularly to FIGURE 1, there is shown a manhole 11, from which extends a trench 12, in which the pipe 13 is to be laid. A projector 14 is positioned to project a collimated beam 15 of parallel rays of light on a predetermined course along the trench, thereby providing a reference by which the pipeline may be set in a manner to be described. The projector 14 comprises a base 16, a standard 17, platform 18, a leveling plate 19, a light tube 20, and a source of light 21. The manhole 11 is excavated to a greater depth than the trench 12 to receive the base 16 of the projector. The base 16, as shown, is a circular steel member having a size and weight to give stability to the projector. The base 16 is placed on the roughly leveled floor 22 of manhole 11. To provide a level base for the projector 14, leveling plate 19 is mounted on platform 18 by means of a universal mounting 23 which comprises an upturned boss 24 on platform 18 drilled to receive a headed shaft 25 which is grooved as at 26 and held in position by a snap washer 27. The leveling plate 19 has a pair of depending ears 28 by which it is journalled to the shaft 25 by means of a pin 29. Thus, the bearing 23 permits tilting of the leveling plate 19 horizontally and vertically with respect to the platform 18. A pair of leveling screws 30—30' are threadedly mounted in the leveling plate 19 and the ends of these screws bear against the platform 18. Bubble vials 31—31' are mounted on the leveling plate 19 along perpendicularly related axes so that its proper orientation may be gauged and fixed by the manipulation of the leveling screws 30—30'. While a specific means of providing a level base for the projector 14 has been described and shown, it is readily understood that other leveling means such as that carried by a surveyor's transit may be substituted therefor.

The projector 14 is pivotally attached at one end to the leveling plate 19 by means of a bracket 32. The bracket 32 is swingably mounted for vertical movement on the boss 34 by a pin 35. A pointer 36 is mounted on the leveling plate 19 to cooperate with a clinometer scale 37 mounted on the light tube 20. The other end of the projector 14 is mounted in a bracket 33 which rests on the leveling plate 19 above a threaded aperture 40 through which an adjustment screw 41 passes, to raise or lower the bracket 33 and end of the projector 14.

The standard 17 comprises a lower bracket 42 attached to the base 16 into which a tube 43 is threaded. A connecting tube 44 is telescopically mounted over the tube 43 and held in positions of adjustment by a set screw 45 having a wing or handle 46. An upper bracket 47 is fixed to the lower surface of the platform 18 to support a depending tube 48. The tube 48 is telescopically mounted within the upper end of the tube 44 and held in positions of adjustment by a set screw 49, having wings 50. By means of the set screws 45, 49, a considerable range of vertical and horizontal adjustment may be obtained for aligning the axis of the light tube 20 with the axis of the pipeline to be laid.

The required azimuth of the light tube 20 for the pipeline is determined by means of a surveyor's transit 51, positioned at the top of the manhole 11 on a tripod mounting, as shown, or on a batterboard mounting (not shown). The marker (not shown) for the next manhole is sighted with the transit 51, and by means of a prism attachment 52, later to be described, the azimuth of the light tube 20 may be aligned with a distant manhole marker. The elevation of the light tube 20 is fixed in accordance with the readings on the transit clinometer 53 in a manner to be described later. The prism attachment 52 comprises an extension tube 54 having a split 55 in the end of said tube. The tube 54 fits over the objective end of a telescope 56 of the well-known surveyor's transit 51. A split collar 57 is fastened around the end 58 of the tube 54 and is provided with a fastening screw 59 to tighten the collar 57 and split end 58 of the tube 54 when it is slipped over the objective end of the telescope 56. The forward end of the extension tube 54 is provided with a flange 60. A ring plate 61, having an aperture 62 of the size of the tube 54 is pivoted to the flange 60 at a point eccentric to the axis of the flange by means of a pivot screw 63. The ring plate 61 is provided with a forwardly extending tab 64, mounted on its lower rim diametrically opposite the screw 63. A pair of bosses 65 and 66 are mounted adjacent the lower edge of the flange 60. When the aperture 62 and tube 54 are in alignment, the tab 64 lies intermediate the bosses 65 and 66. The boss 65 is drilled and threaded to receive a pointed adjustment screw 67, having a knurled head 68, and the boss 66 is drilled to receive a spring biased headed pin 69 having a threaded cap portion 70 mounted in a bore 71 of the bolster 66. A compression spring 72 interposed between the pin 69 and cap 70 biases the two apart. The adjustment screw 67 contacts one side of the tab 64 and the spring-biased pin 69 contacts the opposite side and holds the tab 64 in contact with the adjustment screw 67. Turning of the adjustment screw 67 in either direction will impart movement to the ring plate 61.

A pair of forwardly extending ears 73, 73' are mounted on the annular plate 61, one on either side of the aperture 62, FIGURE 2. A prism holder 74 carrying a right angle prism 75 is pivotally mounted between the ears 73, 73', which are drilled and threaded in the plane of the axis of said extension tube as at 76, 76' to receive bolts 77, 77' which have unthreaded ends 78, 78' on which the prism holder 74 is journaled at the bearings 79, 79' in the extended side edges of said holder. A pair of friction washers 80, 80' are interposed between the ears 73, 73' and the prism holder 74, whereby the latter may be turned to a selected position and will remain in that position. A crib 81 carrying a bubble vial 82 fastened on the inner face of a platform 83 is pivotally attached to the outer sides of the ears 73, 73', by means of a pair of upstanding arms 84, 84' which are drilled as at 85, 85' to receive the bolts 77, 77'. A pair of friction washers 86, 86' are interposed between the arms 84, 84' and the heads of the bolts 77, 77' to hold the crib 81 against movement from the position to which it is turned.

The surveyor's transit 51 is placed over the manhole from which the new line of pipe is to be extended, using a suitable platform (not shown) if necessary and leveled. With the right angle prism 75 turned so that the reflector face of the prism is parallel with the optical axis of the telescope so as not to obstruct the view through the telescope 56, the marker at the next manhole is sighted and the transit 51 is locked. The prism 75 is then turned so that the right angle face of the prism intersects the optical axis of the telescope and the image seen in the transit telescope tube is from beneath the transit. Crib 81 is then positioned beneath the prism 75 and the adjustment screw 67 is advanced or backed up until the bubble seen in the cross-hairs of the transit is centered. The view seen in the telescope will then be at a right angle to the horizontal transverse axis of the telescope. The crib 81 is then turned outward and the prism 75 may be rotated so that the depths of the manhole is seen along a line which is in a vertical plane with the telescope tube 56.

A pair of sights 87, 87' are provided one at either end of the light tube 20 of the projector 14. The projector 14 is moved to one side or the other by moving its base 16 until the sight 87 is seen in the cross-hairs of the telescope 56. The prism 75 is then rotated through a small angle and the projector 14 is moved until the sight 87' is seen in the cross-hairs of the telescope. After each move of the base 16 the levelness of the plate 19 must be checked and if the plate 19 is not level adjustments must be made to bring it to a level plane. Several sightings of the sights 87, 87' will normally be necessary to position the projector so that a beam of light may be projected along the laid-out course of the pipeline. When the azimuth of the projector tube 20 has been established the inclination of the projector tube 20 is fixed by turning the adjustment screw 41 until the reading on the projector clinometer scale 37 agrees with the reading on the transit clinometer 53. The projector 14 is provided with a clinometer scale 37, similar to that of the surveyor's transit clinometer 53 and the angle of inclination of projector 14 is fixed by means of the adjustment screw 41 by setting the pointer 36 at the reading on the clinometer scale 37 which agrees with the reading on the transit clinometer scale 53.

The projector 14 is provided with the well-known pin hole aperture and condensing lens (not shown) for projecting a beam of light having parallel rays. The beam of light 15 is pencil-like in diameter and the light source 21 is of a high candlepower adequate to project the beam a distance of up to 400 feet.

In order to set a section of pipe so that the axis of the pipe is aligned with the axis of the light beam, a target carrier 90 is provided for attachment to the free end of the section of pipe being set. The target carrier 90 comprises a support ring 91, a target or screen 92 of transparent or translucent material, having the vertical lines 93 and horizontal lines 94 scribed thereon, serving as cross-hairs. Also concentric circular lines 95, as shown in FIGURE 4, provide additional reference indicia. The lines 93 and 94 do not cross the innermost of the concentric circles 95, but instead, a dot or bull's-eye 96 is positioned where the lines 93 and 94 would have crossed. A target viewing hood 97 of light-tight construction extends outward from the support ring 91 and has a wall 98 which is positioned at an angle of 45° to the target 92. A mirror 99 is supported on the wall 98 and the plane of the mirror 99 also is at an angle of 45° to the target 92. The hood 97 has an upper portion 100, as shown in FIGURE 3, which projects above the mirror 99 and has an aperture or eyepiece 101 to enable the pipe setter to see the target 92 by looking downward through the aperture 101, said aperture being positioned at an angle of 45° to the mirror 99. As shown in FIGURE 4, the aperture 101 may be provided with a convex rubber cushion 102 for the comfort of the user. The hood 97 is completed with sidewalls 103, each of which carries a handle 104 on its outer face.

To facilitate the speedy laying of pipe, the target carrier 90 should be quickly attachable to the section of pipe being laid and disengageable from the pipe section after it is laid. This may be accomplished by attaching the support ring 91 to an insert pipe 105 which has an outside diameter only slightly less than the inside diameter of the pipe 13, which is being laid. The insert pipe 105 is a metal pipe having a flange 106 welded to the outer end thereof. The support ring 91 and the flange 106 are respectively drilled to receive the bolts 107 to fasten the target carrier 90 to the insert pipe 105. Thus, a new section of pipe being laid would be set by inserting the male end of the pipe in the bell of the previously aligned section, inserting the insert pipe 105 of the target carrier 90 in the bell end of the pipe section being laid and by grasping the handles 104 the pipe end may be moved until the light beam 15 is centered on the bull's-eye 96 when viewed through the eyepiece 101. If the end of the pipe must be raised from the bottom of the trench in order to center the light beam on the target, the pipe setter can hold the pipe in alignment while his helper moves sufficient loose earth or gravel under the pipe to hold it in its aligned position. If the bottom of the trench is too high to center the light beam on the bull's-eye of the target, sufficient earth may be removed from the bottom of the trench. If the bottom of the trench is only slightly higher than necessary to center the light beam which may be determined by the position of the light beam with respect to the concentric lines 95, he may raise the end of the pipe by the handles 104 and drop it, the impact forming a depression in the bottom of the trench.

Insert pipes 105 may be made in many sizes, and if the flanges 106 are all drilled as at 108 to align with the holes 109 in the support 91, the said support ring can readily be attached to the various sizes of insert pipe required for laying related sizes of pipe.

It will be apparent that the projector 14 is initially located so that the exit end of the light tube 20 is disposed very close to the position to be occupied by the adjacent end of the first pipe section. After the projector 14 has been adjusted to align it accurately with the selected axis or course for the pipe line, the adjacent end of the first pipe section can be readily positioend in proper coaxial alignment with the pipe line axis by mere visual inspection of the relative position of the closely adjacent pipe section end and exit end of the light tube 20. When this end of the first pipe section has been fixed in position, as by tamping earth around it, the remote end of the first pipe section can then be coaxially registered with the selected pipe line axis in the manner previously described.

By using the present invention, more than 600 feet of sewer pipeline may be laid per day with less labor than by the use of previously known methods. It is not necessary to wait until the entire trench between manholes is dug. The pipe laying may proceed as soon as the trenching operation has progressed far enough for the pipe setter and his helper to have adequate space to work.

Where the pipesetting immediately follows the opening of the trench, the problem of shoring is reduced to a minimum, since cave-ins do not start immediately after the trench is dug except in very sandly soils; and even in sandy soil, light weight portable shoring will hold back the cave-in long enough to set the pipe by the present invention.

In those cases where the trench is completed between manholes before the pipesetting is begun, the use of the present invention will result in a great saving of time and labor because each section will be quickly and precisely set when it is laid, and no realignment will be necessary when the pipeline between manholes is completed. Where the trench is opened before pipesetting starts, the projector tube may be aligned without the use of the transit, since a target may be set up at the distant manhole at the point where the pipeline is to enter the manhole and the light beam projector may be trained on this point and its position fixed when the light beam exactly intersects the center of the target.

While there has been disclosed in the foregoing description a practical embodiment of the method and means of laying a sewer pipeline in accordance with the present invention, it will be understood by those skilled in the art that variations in the implementing of the concept of the invention and in the technique employed in the carrying out of the method are within the purview and scope of the invention.

What is claimed is:

1. A method of laying a plurality of pipe sections along a selected rectilinear axis to form a subterranean string of pipe sections extending from a source position comprising the steps of projecting a collimated narrow beam of light from said source position along the selected axis, placing a first pipe section at a position wherein said light beam passes therethrough with an end thereof incident to said light beam disposed closely adjacent said source position and coaxially aligned with said light beam, rigidly coupling a target housing member having a translucent target screen to the exit end of said first pipe section relative to said light beam at a position disposing the target screen across the axis of the pipe section, moving said target housing member transversely of said selected axis and thereby moving said exit end of said pipe section while observing said target screen to locate the light beam intercept with said target screen at a position aligned with the axis of said pipe section whereby said exit end of said first pipe section is coaxially aligned with said selected axis, fixing said first pipe section in its aligned position, and serially laying other pipe sections in coaxial alignment with said selected axis by transferring said target housing member to one end of each successive pipe section corresponding to said exit end, coupling the other end of such successive pipe sections to the exit end of the preceding section, and coaxially aligning the exit ends of such other pipe sections with said selected axis by moving said target housing member in the manner recited for aligning said first pipe section.

2. A method of laying a plurality of pipe sections along a selected rectilinear axis to form a subterranean string of pipe sections extending from a source position comprising the steps of projecting a collimated narrow beam of light from a projector at said source position along the selected axis, placing a first pipe section at a position wherein said light beam passes therethrough with an end thereof incident to said light beam disposed closely adjacent said source position, coaxially aligning said incident end of said first pipe section with the light beam by observing the disposition thereof relative to said projector, rigidly coupling a target housing member having a translucent target screen to the exit end of said first pipe section relative to said light beam at a position disposing the target screen across the axis of the pipe section, moving said target housing member transversely of said selected axis and thereby moving said exit end of said pipe section while observing said target screen to locate the light beam intercept with said target screen at a position aligned with the axis of said pipe section whereby said exit end of said first pipe section is coaxially aligned with said selected axis, fixing said first pipe section in its aligned position, and serially laying other pipe sections in coaxial alignment with said selected axis by transferring said target housing member to one end of each successive pipe section corresponding to said exit end, coupling the other end of such successive pipe sections to the exit end of the preceding section, and coaxially aligning the exit ends of such other pipe sections with said selected axis by moving said target housing member in the manner recited for aligning said first pipe section.

References Cited in the file of this patent

UNITED STATES PATENTS

| | | |
|---|---|---|
| 50,182 | Stackpole | Sept. 26, 1865 |
| 327,320 | Saegmuller | Sept. 29, 1885 |
| 575,215 | Davis | Jan. 12, 1897 |
| 705,970 | Shattuck | July 29, 1902 |
| 1,296,248 | Williamson | Mar. 4, 1919 |
| 1,662,836 | Steinle | Mar. 20, 1928 |
| 2,072,286 | Wellington | Mar. 2, 1937 |
| 2,079,791 | Cook | May 11, 1937 |
| 2,304,129 | Thurlow | Dec. 8, 1942 |
| 2,342,828 | Armitage et al. | Feb. 29, 1944 |
| 2,407,845 | Nemeyer | Sept. 17, 1946 |
| 2,436,892 | Hunter | Mar. 2, 1948 |
| 2,475,618 | Johnson | July 12, 1949 |
| 2,482,749 | Eckert | Sept. 27, 1949 |
| 2,546,524 | Schipplock | Mar. 27, 1951 |
| 2,570,275 | Reading | Oct. 9, 1951 |
| 2,570,458 | Kowalczyk | Oct. 9, 1951 |

FOREIGN PATENTS

| | | |
|---|---|---|
| 267,157 | Germany | Nov. 10, 1913 |
| 307,257 | Germany | Aug. 6, 1918 |